April 5, 1932.  O. M. BULLOCK  1,852,693
ROTARY PLOW
Filed June 28, 1929
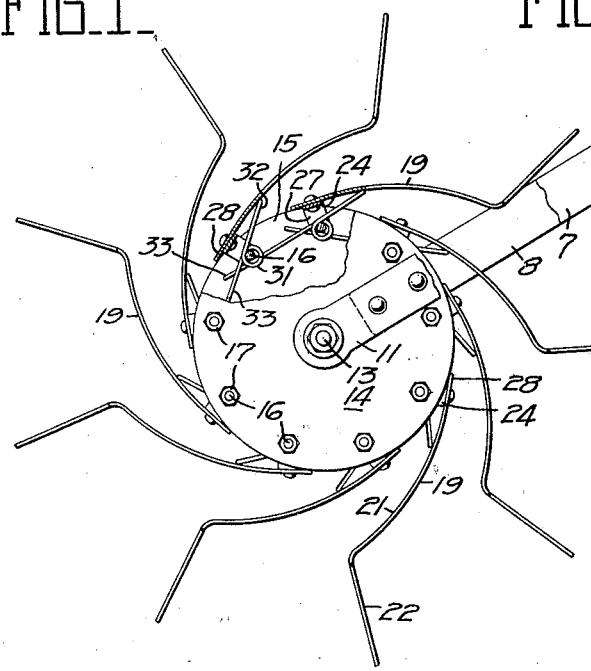
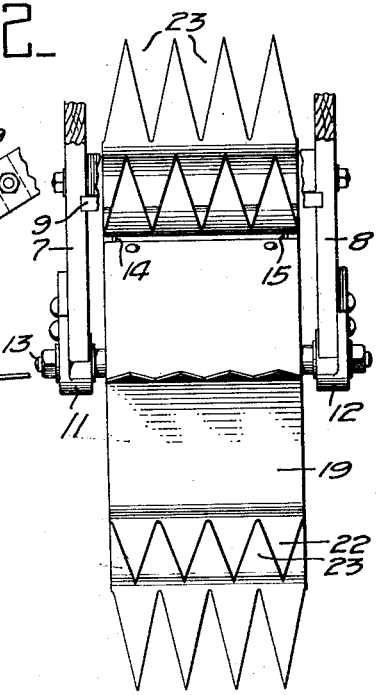
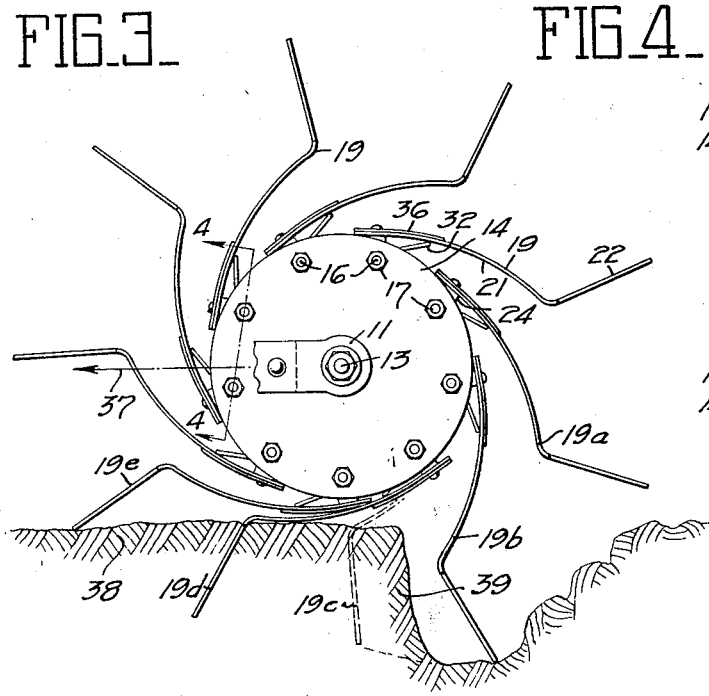
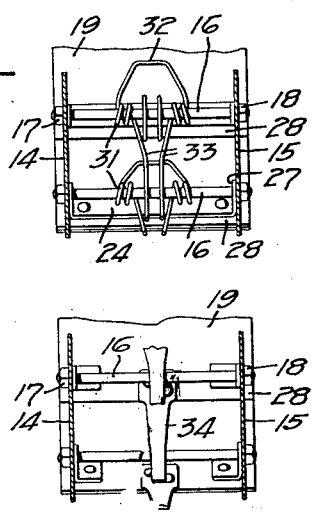
INVENTOR
Orin M. Bullock
BY
White, Prost, Hehr & Lothrop
ATTORNEYS Patented Apr. 5, 1932

1,852,693

UNITED STATES PATENT OFFICE

ORIN M. BULLOCK, OF OAKLAND, CALIFORNIA

ROTARY PLOW

Application filed June 28, 1929. Serial No. 374,499.

My invention relates to soil tilling implements and particularly relates to plows of the type disclosed in my issued Patent No. 1,662,052 of March 13, 1928, entitled "Agricultural implements."

An object of my invention is to improve in general on the plow disclosed in the above entitled patent.

Another object of my invention is to effect an improved spring action of the plow blades.

A further object of my invention is to provide a better method of support for the plow blades.

An aditional object of my invention is to provide means for employing a larger number of plow blades in a given size plow.

The foregoing and other objects are attained in the embodiment of the invention shown in the drawings, in which Fig. 1 is a side elevation of one form of plow constructed in accordance with my invention, portions being broken away to disclose the interior construction.

Fig. 2 is an end elevation of the plow disclosed in Fig. 1.

Fig. 3 is a side elevation of the plow of my invention as it is disposed in use.

Fig. 4 is a cross section on the line 4—4 of Fig. 3, showing one form of spring construction.

Fig. 5 is a view similar to Fig. 4 and shows a modified form of spring construction.

In its preferred form, the rotary plow of my invention preferably includes a plurality of plow blades adapted to rotate on their own axes while rotating about a common axis and is inclusive also of a draft means for propelling the plow and of means for effecting a resilient individual movement of the plow blades.

In the form of my invention illustrated in the drawings I preferably provide a draft frame 6. This frame is usually connected to a suitable source of motive power and can be considerably varied to suit the individual circumstances. In the present instance the frame comprises a pair of arms 7 and 8 which are spaced by a beam 9 and which at their extremities carry journals 11 and 12 for the reception of an axle 13. If desired, the axle may be mounted in anti-friction bearings held by the journals 11 and 12.

Secured to the axle 13 and designed to rotate in unison therewith is a pair of heads 14 and 15 usually of metal and having a circular contour. The heads are spaced apart on the axle and are correspondingly perforated to receive a plurality of shafts 16 which not only pass through the two heads 14 and 15 but are located parallel to each other and parallel to the axis of rotation of the axle 13. Preferably the shafts 16 are confined by securing devices such as nuts 17 and 18 disposed at opposite ends thereof.

In accordance with my invention I preferably equip each of the shafts 16 with a suitable plow blade 19. Since all of the plow blades are identical a description of one of them will suffice. Each plow blade preferably comprises a unitary plate of suitable material, such as metal, which is provided with an initial curved portion 21 disposed usually in the position of an involute spiral having the periphery of the heads 14 and 15 as its base circle. The portion 21 merges with a blade portion 22 which may be serrated on its extremity as at 23 and is usually disposed to lie substantially radial with respect to the axis of axle 13.

I preferably mount each of the blades 19 to have a limited pivotal movement about its respective axis 16 and to this end I provide a bracket 24 properly secured to each of the blades 19 and terminating in ears 26 and 27 which are apertured to encompass the associated shaft 16. By virtue of this arrangement the blade 19 is free to pivot inwardly and outwardly in a general radial direction toward and away from the heads 14 and 15. Preferably also I extend the blade 19 slightly beyond the point of attachment of the bracket 24 to provide an extending lip 28 which contacts with the heads 14 and 15 to provide a stop for the movement of the blade in one direction.

In order to urge the plow blade 19 to one extreme position in which the lip 28 is in contact with the heads 14 and 15 I preferably provide a spring capable of this result. A suitable arrangement is illustrated in Fig.

4 in which a double coil spring 31 is wound about the shaft 16 and is provided with a loop 32 engaging the plow blade. Extensions 33, formed by the terminal portions of the spring, also abut the adjacent shaft 16 to confine the expanding movement of the spring.

In Fig. 5 there is illustrated a modified form of spring which I have also found suitable and in this instance I preferably provide a strap 34 of spring material at one end securely fastened to a plow blade 19 and at its other extremity abutting the adjacent shaft 16 to afford the requisite confinement for the spring.

In either form of the device, each of the plow blades can be forced inwardly toward the drums 14 and 15 by a superior force sufficient to overcome the effect and urging of the springs 31 or 34 while when such a superior force is released the spring is amply strong to impel the plow blade 19 rather rapidly toward its other extreme of movement about the axis of shaft 16. Such return movement of the plow blade occasionally imposes a rather severe strain on the extension 28 and on the pivotal mounting and to withstand such strain in a satisfactory manner I, in some instances, provide a reinforcing plate 36 on a part of the portion 21 of the blade 19. This reinforcement can be a plate of metal and be securely fastened by the same means that fastens the bracket 24. The return movement of the plow blade in this fashion is suitably arrested.

In arranging the plow blades on the drums 14 and 15 I preferably dispose the several shafts 16 with a sufficient degree of closeness that the numerous plow blades 19 overlap each other and when viewed from one end give the general appearance of a sunburst. This disposition is very effective in promoting satisfactory plowing and in Fig. 3 I have illustrated one position of my device when engaged in the act of plowing. It is to be noted that when a force is exerted on the draft frame 6 in the direction of the arrow 37 the heads 14 and 15 are rotated about axis 13 and that as the various portions 22 engage the ground 38 there is also a restricted rotation of each of the plow blades about its particular shaft 16.

As disclosed in Fig. 3 blade 19a has just left the ground and is in one extreme position as urged by its associated spring. The next succeeding blade 19b is in the act of springing outwardly from its innermost radial position and has substantially reached the end of its stroke. Its former position is indicated by dotted lines 19c. The movement from position 19c to position 19b is very rapid and is largely dependent upon the speed of advance of the draft frame 6 and of the strength of the spring impelling the blade to its other extreme position. This movement is very satisfactory in breaking off rather than cutting off a block 39 of soil. The rapid movement and also relatively rapid stopping of the plow blade are effective to throw the block of soil 39 a distance sufficient to cause it to disintegrate and pulverize and thus leave the plowed ground in excellent condition. The blade in position 19d is in inserted position and it will be noted that the weight of the assembly is sufficient so that not only has the portion 22 entered the ground fully but that also the portion 21 is contacting with the surface of the ground. The blade in position 19e is just beginning to enter the soil. Between positions 19d, 19c and 19b, a considerable variation in the radius of action of the penetrating portions of the plow blades occurs and also assists materially in effecting excellent plowing.

It is to be understood that I do not limit myself to the form of rotary plow shown and described herein, as the invention, as set forth in the following claims may be embodied in a plurality of forms.

I claim:

1. A rotary plow comprising an axle, a draft frame connected to said axle, a pair of heads mounted on said axle, a plurality of parallel shafts mounted on said heads, a plurality of plow blades mounted on said shafts and adapted to move in a radial direction, and a spring engaging each of said blades and the next successive shaft for urging said blade radially outward.

2. A rotary plow comprising a draft frame, an axle freely rotatable with respect to said frame, a pair of heads mounted on said axle, a plurality of shafts mounted in said heads, brackets on said shafts, plow blades secured to said brackets and arranged in overlapping relationship, and springs engaging said blades and said shafts for urging said plow blades to rotate about the axes of said shafts.

In testimony whereof, I have hereunto set my hand.

ORIN M. BULLOCK.